Oct. 30, 1956  H. J. BUTLER  2,768,710
DISC TYPE BRAKE FOR VEHICLES
Filed June 15, 1953  3 Sheets-Sheet 1
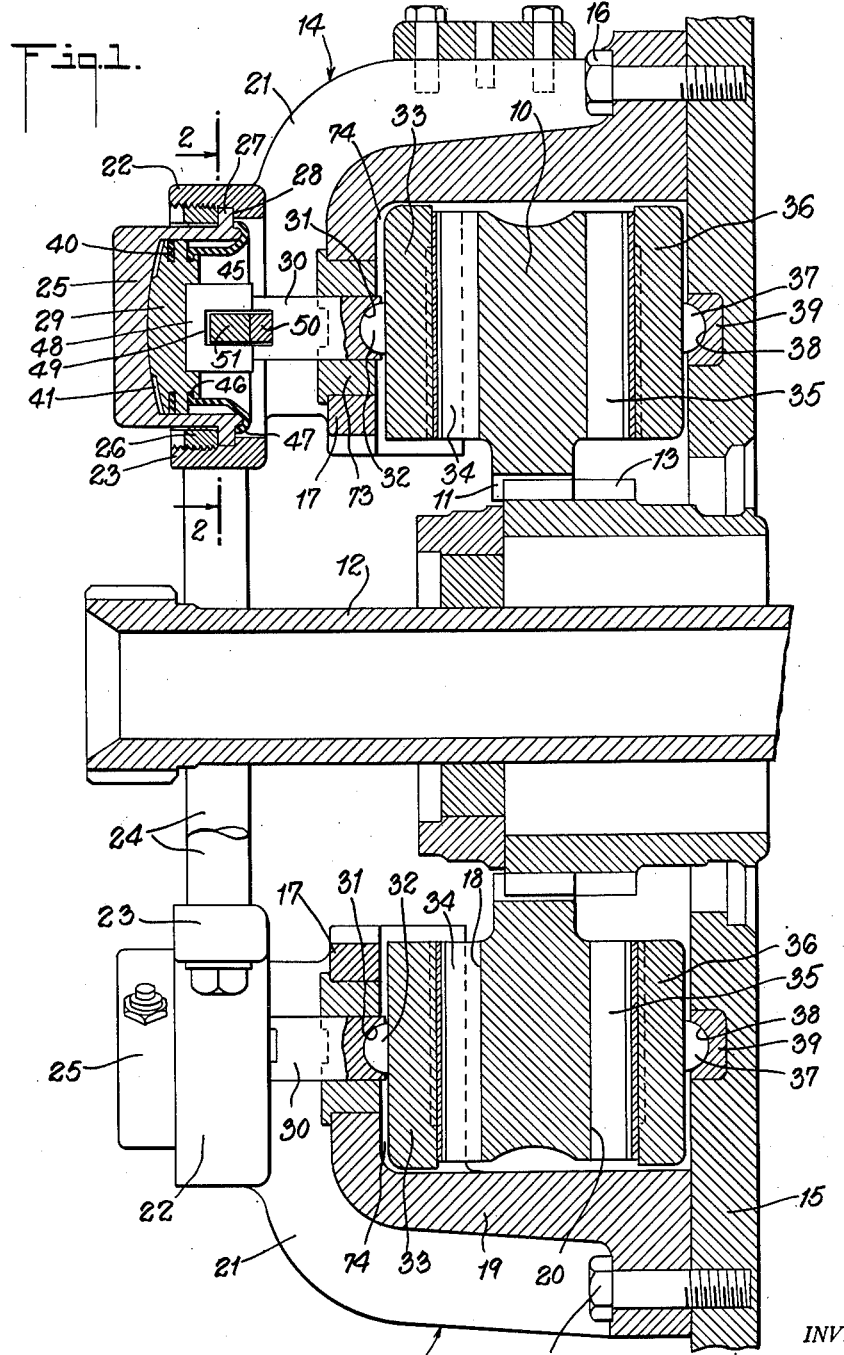
INVENTOR.
HENRY JAMES BUTLER
BY
Benj. T. Clauber
ATTORNEY

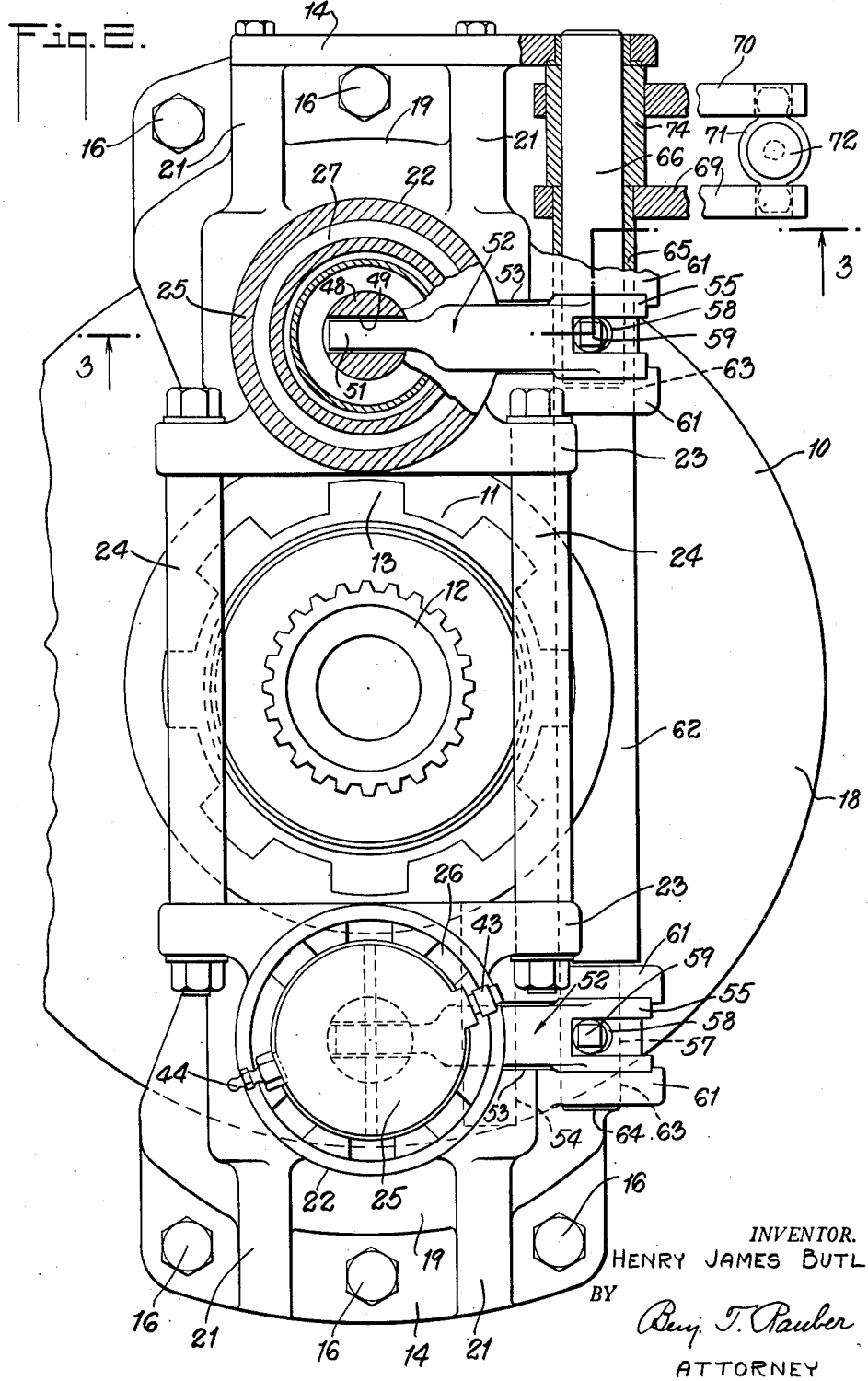

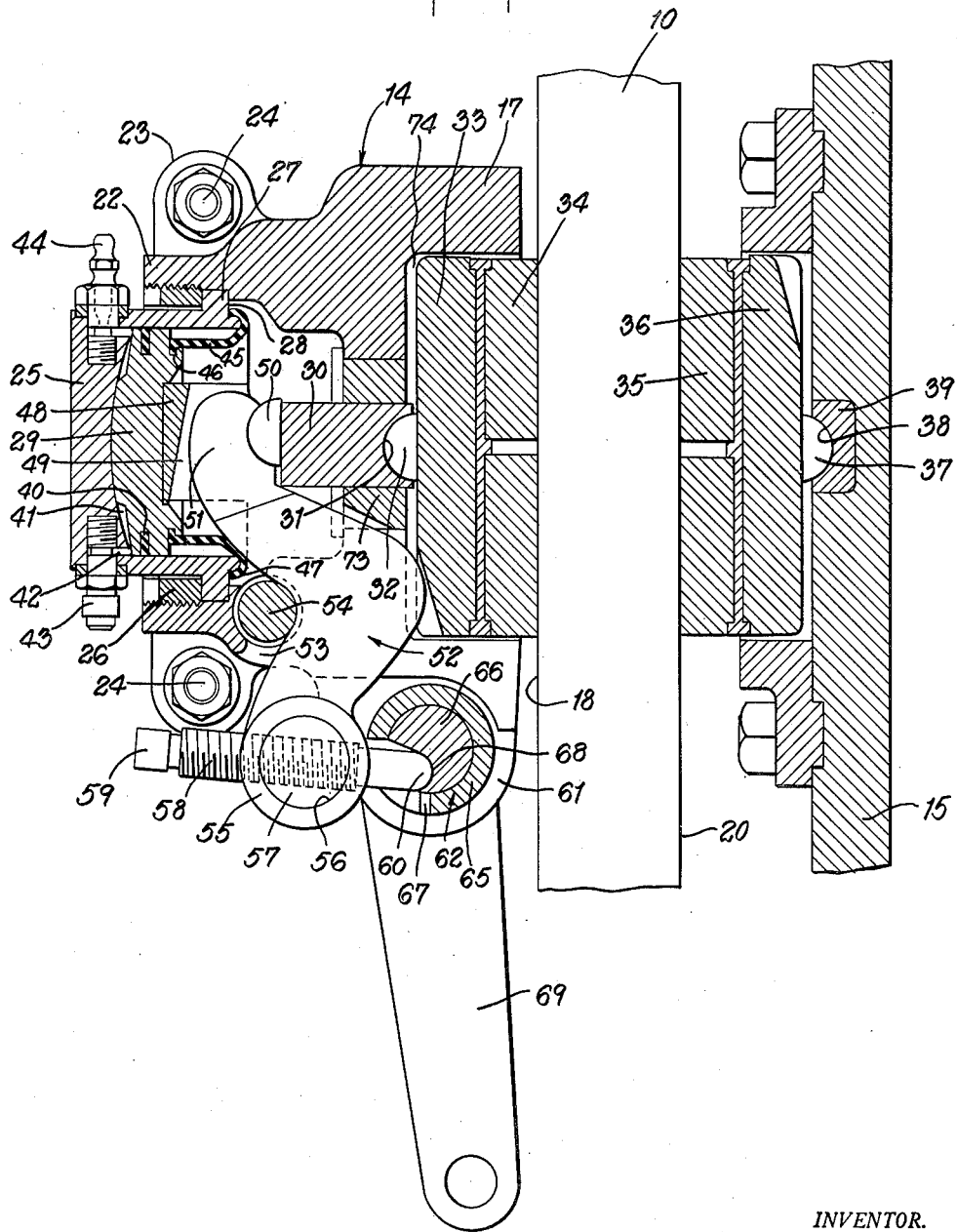

United States Patent Office 2,768,710
Patented Oct. 30, 1956

2,768,710

DISC TYPE BRAKE FOR VEHICLES

Henry James Butler, Sutton Coldfield, England, assignor to Dunlop Rubber Company Limited, London County, England, a British company Application June 15, 1953, Serial No. 361,762

Claims priority, application Great Britain June 21, 1952

2 Claims. (Cl. 188—72)

This invention relates to disc type brakes for vehicles and provides a brake which is particularly suitable for heavy vehicles, especially tanks.

It is desirable that heavy vehicles, and tanks in particular, should be provided with brakes having alternative means for operation, for example, hydraulic and mechanical means.

Thus, should one system fail in service, the brakes will be fully operable on the alternative means.

An object of the present invention is to provide a brake having alternative operating means.

According to the present invention a brake comprises a rotatable and axially movable annular disc, a non-rotatable housing straddling the outer periphery of the disc, a pressure plate slidably associated with the housing, a pad of friction material secured to the pressure plate and engageable with one face of the disc, a pad of friction material associated with the housing and engageable with the other face of the disc, fluid pressure operated means associated with the pressure plate for forcing the friction pads and disc together in frictional engagement and alternative mechanical means also associated with the pressure plate for effecting this engagement.

The arrangement is preferably such that the brake may be applied by either the fluid-pressure operated means or by the mechanical means or by both used together.

For a heavy duty brake two or more sets of pressure plates and friction pads may be provided. The, or each, pressure plate may be connected to the fluid pressure operated means by a mechanical coupling to which the alternative mechanical means is also connected.

Where two or more sets of pressure plates and friction pads are provided they may be jointly operated by the fluid pressure operated means or each pressure plate may be connected to individual pressure operated means. The alternative mechanical means preferably includes equalising means in the connection to the mechanical coupling by which each pressure plate is connected to its individual fluid pressure means whereby balanced application of the pressure plates to the disc may be obtained in order to compensate for uneven wear of the friction material.

Especially in a heavy-duty brake it is preferred to space the fluid pressure operated means away from the main body of the, or each, housing whereby overheating of the fluid by heat generated on application of the brake is largely prevented.

Further according to the present invention a vehicle brake comprises a disc slidably spline mounted on a rotatable shaft, two non-rotatable U-shaped housings straddling the outer periphery of the disc at diametrically opposed points, a pressure plate slidably mounted in one limb of each housing for movement perpendicular to the face of the disc, a pad of friction material secured to each pressure plate for engagement with one face of the disc, a pad of friction material secured to the other limb of each housing for engagement with the other face of the disc, a piston and cylinder mechanism secured to each housing, the piston being coupled by a plunger to the pressure plate which is moved towards the disc to apply the brake upon the application of fluid pressure to the cylinder, and a lever mechanism acting upon each plunger and operable to move the pressure plate to apply the brake independently of the piston and cylinder mechanism.

So that the invention may be more clearly understood an embodiment will now be described with reference to the accompanying drawings in which:

Figure 1 is a partly sectioned plan of a vehicle brake according to the invention.

Figure 2 is an elevation of the brake shown in Figure 1 partly sectioned on line 2—2 of Figure 1.

Figure 3 is a sectional elevation on the line 3—3 of Figure 2.

Referring first to Figures 1 to 3 a vehicle brake comprises an annular disc 10 provided with driving dogs or splines 11 at its inner periphery whereby the disc is adapted to be rotated by and is axially slidable on a sleeve 13 (shown by chain dotted lines in Figure 1) having complementary splines on a portion of its outer surface and mounted on a shaft 12 by which it is adapted to be driven.

Two substantially U-shaped housings 14 straddle the outer periphery of the disc 10 on diametrically opposite sides, and are secured against rotation to a part of the vehicle chassis. Each housing 14 has associated with it a combined fluid pressure and mechanically operated brake applying mechanism, and comprises a limb 15 adjacent one face 20 of the disc 10 and extending towards its centre, a radial part 19 extending axially adjacent the outer periphery of the disc, and extending towards its center. In this embodiment the limbs 15 of the two housings 14 are formed integrally with each other and form a back plate member through which the shaft 12 passes. The limbs 17 and the parts 19 of the housings 14 are formed integrally and are secured to the limbs 15 by bolts 16.

Each housing 14 has two parallel strengthening ribs 21 which extend axially across the radial part 19 and over the limb 17 to merge into a substantially cylindrical part 22 formed integrally with the housing 14 and spaced from the limb 17 by the height of the ribs 21.

Each substantially cylindrical part 22 has a flange 23 extending tangentially across one side, the two flanges 23 being parallel and on adjacent sides of the two substantially cylindrical parts 22. Tie bars 24 connect adjacent ends of the flanges 23, passing one on each side of the driving shaft 12, and serving to hold the assembly rigidly together and prevent distortion when the brake is applied.

A hollow brake cylinder 25 closed at one end and having an outwardly-extending annular flange 27 adjacent the other end is fitted in each substantially cylindrical part 22 and is locked in position by an externally screw threaded locking ring 26 engaging an internal screw thread at the outer end of the substantially cylindrical part 22 and urging the flange 27 of the cylinder 25 tightly into abutment with an internal shoulder 28 on the substantially cylindrical part 22, the open end of the cylinder being presented towards the disc 10. A piston 29 is axially slidable in the cylinder 25, the end of the piston abutting a plunger 30 which is slidably mounted in a guide bush 73 fitted to the adjacent limb of the housing through which the plunger 30 extends axially towards the disc 10.

The end of each plunger 30 has a hollow part-spherical seating 31 to engage a complementary part-spherical abutment 32 on a pressure plate 33 axially slidable in a recess 74 in the part 17 of housing 14. Pads of friction material 34 are secured to the side of the pressure plate 33 adjacent the face 18 of the disc. A similar pressure plate 36 is arranged opposite the pressure plate 33 and has a part-spherical abutment 37 engaging a hollow part-spherical seat 38 in a seating member 39 pressed into a recess in the limb 15 in axial alignment with the plunger 30. Pads of friction material 35 are secured to the side of the pressure plate 36 adjacent the face 20 of the disc.

Each piston 29 has a fluid-tight sealing ring 40, and an annular recess 41 is provided in the crown of the piston 29 and this is connected through a passage 42 (Fig. 3) in the cylinder wall to a pipe union 43 through which fluid pressure may be applied from brake applying means such as a master cylinder under the control of the driver of the vehicle. A bleeder valve 44 is arranged diametrically opposite to the pipe union 43 for releasing any air trapped in the cylinder. An annular rubber dust cover 45 is fitted to the cylinder assembly its inner periphery being located in a groove 46 in the piston and its outer periphery having a flange 47 which is sprung over the open end of the cylinder.

The end 48 of the plunger 30 adjacent the piston is thicker than the other end and has a rectangular slot 49 extending diametrically through it. The end of the slot 49 nearer the pressure plate 33 accommodates a part-cylindrical slider 50 which forms an abutment for one end 51 of a cranked lever 52 which extends transversely through a slot 53 in one of the strengthening ribs 21. The end 51 of the lever 52 has a hollow part-cylindrical seating to engage with the slider 50.

The lever 52 is pivoted on a fulcrum pin 54 accommodated in a bore in the slotted rib, and at its other end 55 has a transverse bore 56 to accommodate a rotatable spindle 57.

The end 55 of the lever 52 is slotted to allow for angular movement of an adjusting screw 58 screwed diametrically through the spindle 57. One end 59 of the screw 58 is squared so that it may readily be turned by a spanner or key, whilst the other end 60 is rounded.

Two lugs 61, parallel to one another and spaced a short distance apart, extend from the side of the limb 17 of each housing 14, the lugs being arranged so that the end 60 of the adjusting screw 58 may project between them. A shaft 62 projects through and is rotatable in aligned bores 63 in the lugs 61. One end 64 of the shaft 62 is reduced in diameter where it passes through the bores 63 in one pair of lugs 61, and these bores are correspondingly of smaller diameter than the bores in the other pair of lugs. The other end 65 of the shaft 62, where it passes through the other pair of bores, is hollow to accommodate a second shaft 66, and has a slot 67 in its wall corresponding with the space between the lugs, through which the end 60 of the corresponding adjusting screw may pass to engage the second shaft 66.

The reduced end 64 of the shaft 62 and the second shaft 66 each have an eccentric recess 68 of suitable shape to form a seating for the rounded end 60 of the corresponding adjusting screw 58.

The hollow end 65 of the shaft 62 where it projects beyond the adjacent lugs 61 has secured to it and extending laterally from it an operating lever 69. A similar lever 70 is secured to a spacing boss 74 non-rotatably fixed by key, pin or other means (not shown) to the end of the second shaft 66 which projects beyond the end 65 of the shaft 62. The two levers 69, 70 project parallel to each other and a short distance apart and are joined at their ends remote from the shafts 62, 66 by a bridge piece 71. The bridge piece 71 has ball-shaped ends which engage with bores in the ends of the levers 69, 70 to permit limited angular movement between the levers. At its middle portion the bridge piece 71 has a boss 72 for attachment to the end of a brake operating rod (not shown) or other mechanism.

The construction described enables the brake to be operated by fluid pressure (e. g. hydraulically) or mechanically, or both together. To operate the brake hydraulically a master cylinder or like brake applying means is pressurised to supply high pressure fluid to the cylinders 25. The increase in fluid pressure in the cylinders 25 forces the pistons 29 outwardly and they in turn move the plungers 30 and pressure plates 33 outwardly to force the pads of friction material 34, 36 and the disc 10 together in frictional engagement.

For mechanical operation of the brake the levers 69, 70 are moved angularly by the brake operating mechanism applied to the bridge piece 71 rotating the associated shafts 62, 66. Rotation of each shaft rotates its eccentric recess 68, causing the adjusting screw 58 to be moved outwardly with respect to the housing 14, that is to the left in the position shown in Figure 3. This outward movement of the screw 58 pivots the cranked lever 52 about its fulcrum pin 53 causing its end 51 to move towards the disc 10, forcing the friction material and the disc together in frictional engagement.

As the pads of friction material wear, after constant use, so the piston 29 of each fluid pressure operated mechanism moves progressively down the cylinder 25, and the plunger 30 associated with said piston angularly moves the cranked lever 52 so that, when the handbrake or the like is in the "off" position the rounded end 60 of the adjusting screw 58 is unseated from its recess 68 in the shaft. Play of this nature is undesirable, and by rotating the screw 58 in its spindle 57 from time to time it may be taken up, thus compensating for wear of the pads.

The pads of friction material on one side of the disc do not necessarily wear at the same rate as those diametrically opposite. This uneven wear 26 accommodated by the ball shaped ends of the bridge piece 71 permitting the levers 69, 70 to be moved through slightly different angular distances corresponding to the difference in wear of the pads of friction material on the two sides of the assembly to allow the pads to "bed" before the braking pressure is applied and so to apply equal forces to both plungers 30.

The spacing of the substantially cylindrical part 22 away from the limb 17 of each housing 14 by the height of the ribs 21 largely prevents overheating of the pressure fluid in the cylinders 25. Heat generated by friction between the friction material and the faces of the disc 10 is transferred to the associated housing 14, and conducted to the substantially cylindrical part 22, and the brake cylinder 25 only by the ribs 21, so that the pressure fluid is not greatly affected by the rise of temperature of the disc and the housing. Also the space between the ribs 21 and the substantially cylindrical part 22 may permit a current of air to pass when the vehicle is in motion, further to reduce heat transfer to the pressure fluid.

Having now described my invention, what I claim is:

1. A vehicle brake comprising a rotatable and axially movable annular disc, a non-rotatable housing straddling at least a portion of the outer periphery of the disc and in fixed axial position, at least two sets of pads of friction material secured to the housing opposite one face of said disc, pressure plates, one for each friction pad, slidably mounted on said housing to move toward and from the opposite face of said disc and each carrying a pad of friction material to press against said face of said disc, fluid operated means having a plunger between said fluid operated means and each of said slidably mounted pressure plates to move said pressure plates toward said disc and alternatively operated mechanical means acting on said plunger to move said slidable plates towards said disc independently of said fluid operated means and comprising an equalizing transmission to balance the pressure on the sets of pressure plates and friction pads.

2. A vehicle brake comprising a disc slidably spline mounted on a rotatable shaft, two non-rotatable U-shaped housings straddling portions of the outer periphery of the disc at diametrically opposed points, pressure plates, one slidably mounted in one limb of each housing for movement to the face of the disc, pads of friction material, one secured to each pressure plate for engagement with one face of the disc, pads of friction material, one associated with the other limb opposed to the pad of friction material on the other side of the disc to engage the opposed side of the disc, a piston and cylinder mechanism associated with each housing, the piston being coupled by a plunger to the pressure plate which is moved towards the disc to apply the brake upon the application of fluid pressure to the cylinder, a pair of aligned rock shafts, one for each plunger, a driving crank arm for each said shaft, a common actuating means for said driving cranks and a driving transmission from each shaft to the lever of its respective pressure plate to move the pressure plate to apply the brake independently of the piston and cylinder mechanism.

References Cited in the file of this patent

UNITED STATES PATENTS

| | | |
|---|---|---|
| 2,228,818 | Eksergian | Jan. 14, 1941 |
| 2,399,010 | Eksergian et al. | Apr. 23, 1946 |
| 2,541,032 | Butler | Feb. 13, 1951 |
| 2,575,578 | Bricker | Nov. 20, 1951 |
| 2,614,662 | Hawley | Oct. 21, 1952 |
| 2,672,223 | Butler | Mar. 16, 1954 |